Nov. 5, 1929.　　　G. A. LARSON　　　1,734,261
GRAIN SEPARATOR
Filed March 26, 1928
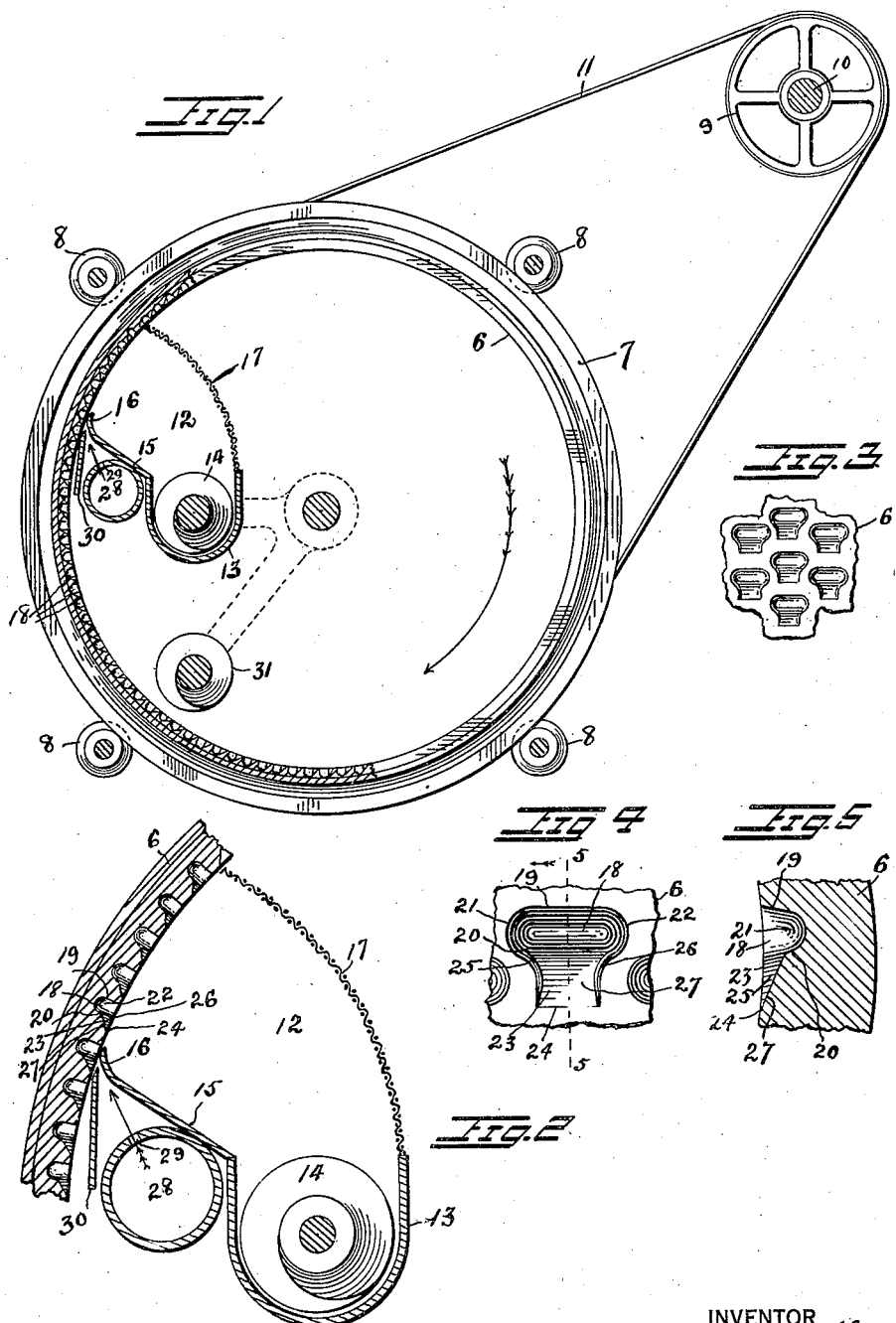
INVENTOR
George Andrew Larson
BY
D. R. O'Neail
ATTORNEY Patented Nov. 5, 1929

1,734,261

UNITED STATES PATENT OFFICE

GEORGE ANDREW LARSON, OF MINNEAPOLIS, MINNESOTA, ASSIGNOR TO WALTER DOUGLAS DALE, OF MINNEAPOLIS, MINNESOTA

GRAIN SEPARATOR

Application filed March 26, 1928. Serial No. 264,849.

This invention relates to the type of grain separator disclosed in Letters Patent of the United States No. 1,455,693 granted to Ora Wood Williams, under date the 15th day of May, 1923, and has for its main object the provision of an improved form of pocket designed to more effectually accomplish the separation of grains of different sizes and shapes, such, for instance, as the separation from wheat or oats, cockle, wild peas and the numerous types of small seeds commonly found mixed with wheat as it comes from the threshing machine.

With this and certain other objects in view which will appear as the description proceeds, the invention resides in the novel design of the pockets and the arrangement of the related parts of the apparatus first fully described in the following specification and later more particularly pointed out in the appended claims, reference also being had to the drawings forming part hereof in which similar characters of reference indicate similar parts throughout the different views, and in which—

Fig. 1 is a view, partially in end elevation and partially in transverse vertical section, illustrating the invention as incorporated in a separator of the cylindrical type.

Fig. 2 is a cross section of a fragment of the separating cylinder showing the receiving hopper located therein and the means whereby a blast of air is directed upwardly through the separating pockets to ensure the discharge of the grain therefrom into the receiving hopper.

Fig. 3 is a fragment of the cylinder showing the grouping of the separating pockets on the inner surface thereof.

Fig. 4 is a fragment of the inner surface of the cylinder or drum showing a very much enlarged elevation of one of the separating pockets therein, and Fig. 5 is a sectional view of the pocket taken substantially upon the plane of the line 5—5 in Fig. 4.

In the drawings 6 indicates the separating drum or cylinder of the machine, which may be provided with exterior flanges or rings 7 adapted to run in curved or grooved wheels 8, such being a mounting permitting of the rotation of the drum from a pulley 9 mounted upon a power shaft 10, by means of a belt 11.

Within the drum at a suitable point between the axis and the inner surface of the same, is a collecting hopper 12, the lower portion of which is shaped to form a trough 13 in which is mounted a spiral conveyor 14.

The lower side 15 of the hopper 12 extends from the edge of the trough 13 to a point closely adjacent the inner periphery of the drum 6 at an incline suitable to direct the grain received from the drum into the conveyor trough, the outer extremity of the said side being preferably curved upwardly as shown at 16.

The upper side of the hopper 12, indicated as 17, is preferably formed from some perforate material, such for instance as woven wire, for a purpose to be hereinafter explained.

The inner surface of the drum is studded with pockets of novel design, the grouping of the said pockets being best shown in Fig. 3, and the shaping of the same best illustrated in Figs. 4 and 5. These pockets are formed by comparatively deep concave depressions 18 elongated transversely of the line of movement of the drum, having substantially parallel sides 19 and 20 merging into semi-circular ends 21 and 22.

The lower sides of the pockets 18, as related to the direction of their movement, are cut away to form flat bottomed spillways 23, which, starting at their lower extremity 24, increase in depth as they approach the pockets 18 into which they merge intermediate the depth of the same.

The walls 25 and 26 of the spillways merge into the rounded ends 21 and 22 of the pockets 18 and partake of the slopes of the same, so that the said walls have a flaring outward divergence from the floors 27 of the spillways, until they run out at the lower extremities 24 of the same.

By reference to Fig. 4 it will be seen that the walls 25 and 26, although parallel on the surface, encroach slightly upon the floors of the spillways at the top and then diverge, so that the spillways decrease in depth and increase in width in a downward direction. It will further be noted that the pockets 18 are rounded in all directions except their surface shape which is oblong and that at no point are the spillways of greater depth or even of equal depth to that of the pockets.

For the separation of oats and other grains from wheat, the pockets 18 are made of a size suitable for the reception of the largest kernels of wheat but not long enough to receive oats. They will of course also receive all other grains and seeds smaller than the wheat kernel, and, on the rising side of the drum the pockets will carry all these seeds and grain upwards but the smaller will promptly run out of the pockets into the spillways which they will leave to again become part of the mass in the drum. The oats also, being unable to enter the pockets, will merely roll against the surface of the drum.

The wheat, however, being able to enter fully into the pockets with the ends of the kernels supported in the ends 21 and 22 of the same, will be carried to a much higher position than any of the other grains or seeds, in fact these others will never reach the lower side 15 of the hopper, while the wheat will be carried above the said side and when discharged will fall into the hopper.

In order to ensure the prompt discharge of the wheat from the pockets I may make use of an upwardly directed air blast, the apparatus necessary to which would comprise an air delivery tube 28 extending through the cylinder, preferably located in the angle between the under side of the side 15 of the hopper and the drum, the said tube being slotted longitudinally as at 29, for the exit of air therefrom, and the air being directed out in the manner of a nozzle, under the curved portion 16 of the hopper side 15, by a guide member 30 directly up through the spillways 23 into the pockets 18 behind the kernels of wheat therein, thus effectually dislodging them from the pockets.

This air also serves to pick up any dust which may have accumulated in the pockets and carry it in suspension across the hopper and out through the woven wire 17, after which it will settle in the cylinder.

The numerals 31 indicate a spiral conveyor which works along the lower surface of the drum to expel the oats and other rejected material therefrom.

In operation the pockets as described have proven a satisfactory means for picking up the wheat, while the wide diverging shape of the spillways makes it impossible for other grains or material to become lodged therein to be carried over with the wheat into the hopper.

What I claim is—

1. A separating surface formed with pockets having spillways merging thereinto which increase in width as they depart from the said pockets.

2. A separating surface formed with pockets which are elongated transversely of their direction of movement having spillways merging thereinto which increase in width as they depart from the pockets.

3. A separating surface formed with pockets that are elongated transversely of their direction of movement having spillways merging thereinto that decrease in depth and increase in width as they depart from the pockets.

4. A separating surface formed with concave pockets that are elongated transversely of their direction of movement having spillways merging thereinto that increase in width as they depart from the pockets.

5. A separating surface formed with concave pockets having parallel sides extending transversely of the direction of their movement and rounded ends, and spillways having inclined floors merging into the pockets downwardly directed therefrom.

6. A separating surface formed with concave pockets elongated transversely of their direction of movement and downwardly directed spillways having inclined floors merging into the pockets and outwardly and downwardly flaring side walls.

7. A separating surface formed with concave pockets having parallel sides extending transversely of their direction of movement joined by rounded ends, and spillways downwardly directed from the pockets having floors inclined towards the pockets merging thereinto intermediate the tops and bottoms thereof.

8. A separating surface formed with concave pockets having parallel sides elongated transversely of their direction of movement joined by rounded ends, and spillways downwardly directed from the pockets having inclined floors and flaring side walls merging into the said pockets.

9. A separating surface formed with concave pockets elongated transversely of their direction of movement and downwardly directed spillways having side walls merging into the sides of the pockets adjacent the ends thereof and partaking of the slopes of the same curving around in spaced relation to define floors of plane formation inclined towards the pockets and of decreasing width as they approach the same.

10. A separating drum having its inner surface formed with pockets having spillways downwardly directed therefrom and merging thereinto, and means to direct a blast of air upwardly through the spillways into the pockets.

11. A separating drum provided on its inner surface with pockets elongated transversely of their direction of movement, spillways downwardly directed from the pockets and merging thereinto, a hopper within the drum, means to rotate the drum to elevate the pockets, and means to direct a blast of air upwardly through the spillways into the pockets when the said pockets have reached a predetermined elevation.

12. A separating drum provided on its inner surface with pockets shaped to receive a kernel of grain, spillways merging into the pockets downwardly directed therefrom, a hopper within the drum, having an imperforate lower side, means to rotate the drum, means to direct a blast of air upwardly through the spillways into the pockets to discharge the grain therefrom into the hopper, and a screen positioned to prevent the escape of grain with the air beyond the hopper.

GEORGE ANDREW LARSON.